Sept. 11, 1951     D. F. WINTER ET AL     2,567,749

ROTARY GAP MODULATOR

Filed Nov. 29, 1945

INVENTORS
DAVID F. WINTER
CARL A. CARLSON
BY
M. O. Hayes

ATTORNEY

Patented Sept. 11, 1951

2,567,749

UNITED STATES PATENT OFFICE 2,567,749

ROTARY GAP MODULATOR

David F. Winter, Cambridge, and Carl A. Carlson, Roxbury, Mass., assignors, by mesne assignments, to the United States of America as represented by the Secretary of the Navy Application November 29, 1945, Serial No. 631,753

9 Claims. (Cl. 171—97)

This invention refers to modulators, such as may be used in radar transmitters, and more particularly to modulators using a plurality of pulse forming networks.

In very high frequency transmitter circuits in which the electromagnetic output is pulsed, a magnetron is usually used as a source of high frequency energy. To produce the high frequency oscillations the magnetron must be energized by a pulse of preferably rectangular wave form and of a voltage amplitude depending on the characteristics of the magnetron. Such a voltage pulse is satisfactorily furnished by a rotary spark gap modulator, in which a pulse forming network is alternately charged from a voltage source and then discharged through the load to obtain the desired voltage pulse.

Generally, high powered rotary spark gap wheels are operated at low repetition rates, with the size of the rotary disk and the number of contacts on the disk and on the stationary electrode determined accordingly. A higher pulse repetition rate would require greater speed of rotation or more contacts. The present invention makes it possible to achieve a higher pulse repetition rate without changing the size of the rotary disk or its speed of rotation.

An object of this invention is to provide a modulator circuit in which the pulse repetition rate is increased by use of a plurality of pulse forming networks.

Another object of this invention is to provide a modulator circuit using a plurality of pulse forming networks from which pulses may be supplied at two or more repetition rates, each being a synchronized ratio of the other.

Another object of this invention is to provide a modulator using a plurality of pulse forming networks from which pulses of different pulse duration may be supplied in a definite sequence.

Other objects and features of this invention will become apparent upon a careful consideration of the following detailed description when taken together with the accompanying drawing, in which.

Figure 1:
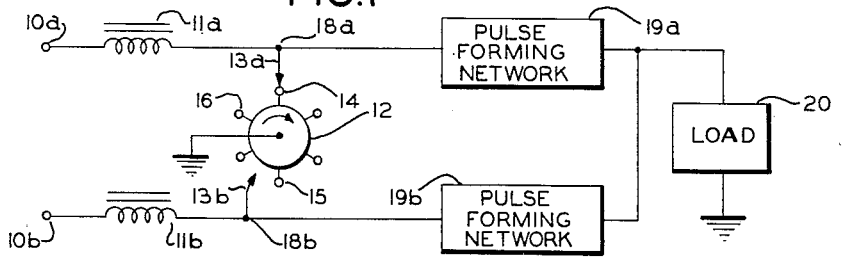
Fig. 1 is a diagram of an embodiment of the invention.

Referring to Fig. 1 the following preliminary analysis of an elementary combination comprising charging inductance 11a, rotary spark gap 12, pulse forming network 19a, and load 20 may be given. This analysis applies in general to rotary spark gap modulators comprising these elements. To terminal 10a is connected a voltage source, which may be a direct voltage of E kilovolts. At an instant at which pulse forming network 19a has just been discharged by a spark discharge between fixed contact 13a and moving contact 14, terminal 18a is at ground potential. This instant is indicated by 22a in Fig. 2. As soon as the spark gap ceases to be conducting, the high voltage source on terminal 10 begins building up a charge on pulse forming network 19a through charging impedance, here inductance 11a and load 20, the impedance regulating the charging of said pulse forming network and isolating the voltage source.

During the charging period pulse forming network 19a has the characteristics of a capacitance, and in combination with charging inductance 11a preferably constitutes a series resonant circuit at a frequency of one-half the pulse repetition rate of the elementary combination under discussion. For the purpose of explanation load 20 may be taken to have negligible influence on the charging curve.

Figure 2:
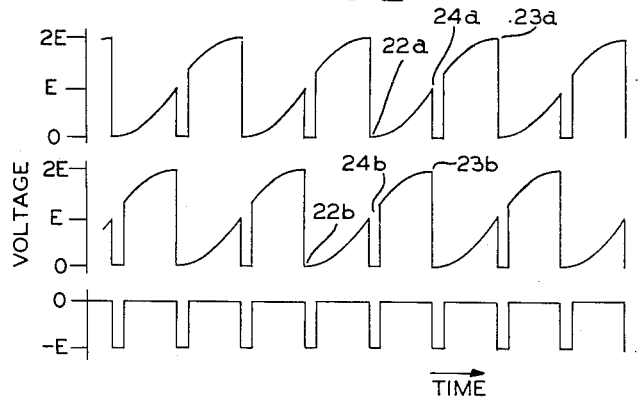
Fig. 2 is a series of voltage-time plots taken to illustrate the operation of the embodiment of Fig. 1.

A voltage-time plot of the charging of pulse forming network 19a, observable on terminal 18a, is represented in Fig. 2 by the general shape of the curve between 22a and 23a. This curve is essentially sinusoidal with a minimum at 22a and with 23a preferably at a maximum, and of peak amplitude somewhat less than 2E.

At a time corresponding to 23a the rotary disk of spark gap 12 will have turned so that moving contact 16 will be adjacent to fixed contact 13a. This proximity combined with the high voltage charge built up on pulse forming network 19a causes the gap to break down in a spark discharge between contacts 16 and 13a, permitting pulse forming network 19a to be discharged through a circuit including spark gap, ground, and load 20. At this time under the preferable conditions of discharge occurring at the maximum of the sinusoidal voltage wave inductance 11a will be carrying zero current and during the discharge may be considered as an open circuit to the rapid change in voltage. This time corresponds to point 23a in Fig. 2.

In discharging, pulse forming network 19a, which may be a Guillemin Line, supplies to load 20, which may be a combination containing a magnetron, a pulse transformer to a magnetron, or other load to be pulsed, or a transmission line coonnected to one of these, a rectangular voltage pulse of a definite duration determined by the construction of the pulse forming network. The impedance of the pulse forming network is preferably made to match the impedance of the load, in which case the pulse voltage applied to the load is slightly less than E kilovolts.

Numerous variations of the elementary circuit are known in the art. One example is the insertion of a charging diode in series with the charging circuit, its plate being connected, for example, to the charging inductance 11a and its cathode to terminal 18a. Its purpose is to prevent the loss of charge once attained on pulse forming network 19a and hence to permit a wider latitude in the choice of circuit constants. Another variation is the use of a charging resistor in place of a charging inductance. This variation would sacrifice the advantage of being able to charge the pulse forming network to twice the voltage of the voltage source. Another variation, disclosed in patent application, Serial No. 625,664, filed October 30, 1945, of Harry J. White, is the use of an alternating voltage source on terminal 10a.

In the embodiment of Fig. 1 two pulse forming networks are used to double the pulse repetition frequency. The two fixed contacts 13a and 13b are preferably so positioned that when one is adjacent to a moving contact, the other is midway between two moving contacts. As the disk rotates, therefore, spark discharges occur successively at the increased pulse repetition rate between contacts 13a and 14, contacts 13b and 15, contacts 13a and 16, and so on as the disk rotates. Thus pulse forming networks 19a and 19b are made to discharge at different and predetermined times here alternately, and a pulse is furnished load 20 with every 30 degrees of rotation of the disk instead of every 60 degrees, as would be the case if only one pulse forming network were used.

If terminals 10a and 10b are connected to the same direct voltage source the voltage-time relations of Fig. 2 may be observed. The two upper curves may be observed at terminals 18a and 18b respectively. It can be seen that the pulse voltage discharge of each pulse forming network is superimposed on the charging voltage of the other network, as indicated at 24a and 24b due to change in voltage occurring across load 20 at this time. The lower curve represents the pulse voltage across load 20.

It may be useful to connect terminals 10a and 10b to different voltage sources or to different taps on the same voltage source, making it possible to deliver alternate pulses to the load at different voltage levels. Such a device would make it possible to pulse the same magnetron alternately at two different frequencies due to the characteristics of magnetrons producing different frequencies when pulsed by different voltages. Further, pulse forming networks 19a and 19b may be constructed to deliver pulses of different pulse duration, making it possible to pulse the load alternately at different pulse widths. Such a device when used with a suitable indicator would be useful in achieving better range resolution of a radar without sacrificing range. Use of an alternating voltage source on terminals 10a and 10b would necessitate proper phase relationships of the voltages. Preferably the voltages should differ 90 degrees in phase, which could be achived by using two taps on the same alternating current generator or by use of a Scott-connected trasformer.

Figure 3:
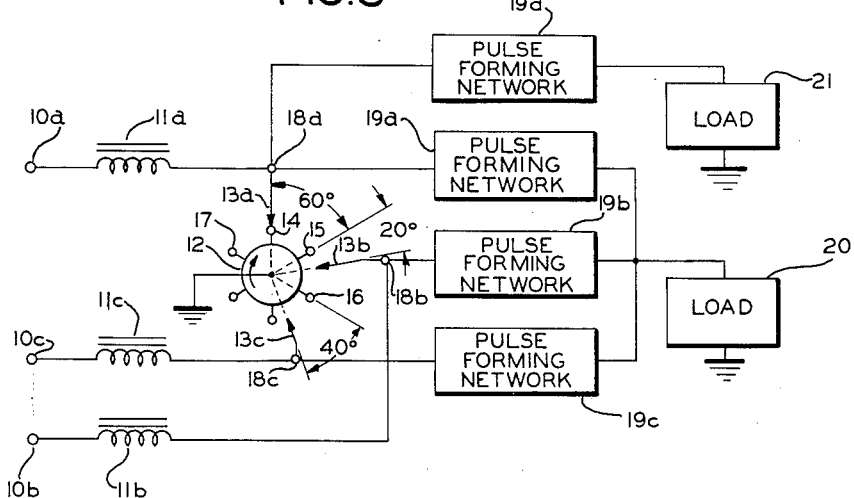
Fig. 3 is a diagram of a second embodiment of the invention.

A second embodiment of the invention is shown in Fig. 3, in which the pulse repetition rate is trebled by the use of three pulse forming networks. The explanation of this combination is similar to the foregoing, pulse forming networks 19a, 19b and 19c being successively discharged by spark discharges between contacts 13a and 14, contacts 13b and 15, and contacts 13c and 16 respectively, each spark discharge producing a voltage pulse across the load. This aspect of the invention is not limited to the use of two or of three pulse forming networks but may be extended to the use of any plurality of pulse forming networks to increase the pulse repetition rate, or to obtain other advantages described.

The embodiment of Fig. 3 shows an additional aspect of the invention making it possible to synchronize the pulse repetition rate on one load with a multiple rate on another load. Pulse forming networks 19a and 19d discharge simultaneously producing pulses to their respective loads 20 and 21. During their charging period networks 19b and 19c discharge successively. Thus load 20 receives three pulses for one to load 21, the pulses being synchronized. This aspect of the invention is not limited to the use of the number of pulse forming networks given in the embodiment, nor is it limited to the ratio of pulse repetition rates given in the embodiment, but may be applied to any suitable plurality of pulse forming networks or any ratio of pulse repetition rates.

Those skilled in the art will realize that the principles of this invention will apply to modulators other than those using rotary spark gap switches. For instance, a thyratron switch or a series gap switch could be used with each pulse forming network, provided suitable triggers were furnished to each switch to cause it to discharge its corresponding pulse forming network at the proper time.

Numerous additional applications of the above-named principles will occur to those skilled in the art and no attempt has been made to exhaust all the possibilities. The scope of the invention is defined in the following claims.

What is claimed is:

1. An electrical system comprising a load, a plurality of pulse forming networks, a plurality of corresponding impedances, a source of voltage to charge each of said pulse forming networks through the corresponding one of said impedances, said impedances regulating the charging of said pulse forming networks and isolating said voltage source, means for connecting each of said plurality of pulse forming networks to said load at different and predetermined times, whereby said pulse forming networks upon being so connected will each discharge through said load.

2. An electrical system comprising a load, a plurality of pulse forming networks, a plurality of corresponding impedances, a plurality of corresponding voltage sources, each to charge a corresponding pulse forming network through the corresponding one of said impedances, said impedances regulating the charging of said corresponding pulse forming networks and isolating said corresponding voltage source, means for connecting each of said plurality of pulse forming networks to said load at different and predetermined times, whereby said pulse forming networks upon being so connected will each discharge through said load.

3. An electrical system comprising a load, a plurality of pulse forming networks, a plurality of corresponding inductances, a source of voltage to charge each of said pulse forming networks through the corresponding one of said inductances, said inductances regulating the charging of said pulse forming networks and isolating said voltage source, a rotary spark gap for connecting by spark discharge each of said plurality of pulse forming networks to said load at different and predetermined times, whereby said pulse forming networks on being so connected will each discharge through said load.

4. With the combination of claim 1 an additional load and an additional pulse forming network corresponding to said load, said pulse forming network being charged coincidentally with one of said first-mentioned pulse forming networks and through the impedance corresponding to said one pulse forming network, said additional pulse forming network also being discharged coincidentally with said one pulse forming network.

5. With the combination of claim 1 a plurality of additional loads and a plurality of corresponding additional pulse forming networks, said pulse forming networks being charged coincidently with certain of said first-mentioned pulse forming networks and through the impedances corresponding to said certain pulse forming networks, said additional pulse forming networks also to be discharged coincidentally with said certain pulse forming networks.

6. A rotary spark gap type modulator to impulse an ultra-high frequency oscillator comprising a pair of pulse forming networks, each having energy storing capacity, a source of voltage for energizing said networks, connecting leads between said source and each of said networks, a pair of inductors in said connecting leads, said inductors regulating the charging rate of said pulse forming networks and isolating said voltage source, an ultra-high frequency oscillator circuit, and a rotary spark gap adapted to connect by spark discharge each of said pulse forming networks alternately at predetermined intervals to modulate said oscillator circuit to emit pulses of radio frequency energy.

7. A rotary spark gap type modulator to impulse an ultra-high frequency oscillator comprising a pair of pulse forming networks, each having capacity for storing energy, a source of voltage to energize each of said networks, connecting leads between said source and each of said networks, a pair of inductors in said connecting leads, said inductors regulating the charging rate of said pulse forming networks and isolating said voltage source, an ultra-high frequency oscillator circuit, a rotary spark gap adapted to connect by spark discharge each of said pulse forming networks to modulate said oscillator circuit alternately at predetermined times, said source of voltage being adapted to charge said networks to produce alternate pulses at differing voltage levels whereby said modulated oscillator emits pulses of radio frequency energy alternately at differing frequencies.

8. A rotary spark gap type modulator to impulse an ultra-high frequency oscillator comprising a pair of pulse forming networks, each having capacity for storing energy, a source of voltage to energize each of said networks, connecting leads between said source and each of said networks, a pair of inductors in said connecting leads, said inductors regulating the charging rate of said pulse forming networks and isolating said voltage source, an ultra-high frequency oscillator circuit, a rotary spark gap adapted to connect by spark discharge each of said pulse forming networks to modulate said oscillator circuit alternately at predetermined times, said pulse forming networks being adapted to produce alternate pulses of differing time durations whereby said oscillator circuit emits pulses of radio frequency energy alternately of differing time durations.

9. A rotary spark gap modulator circuit to impulse an ultra-high frequency oscillator comprising a plurality of pulse forming networks, each having energy storing capacity, a source of voltage for charging said networks, connecting leads between said source and each of said networks, the lead to each network including an inductor, a rotary spark gap wheel having a number of contacts equally spaced about its periphery, a plurality of fixed contacts equally spaced electrically within said rotary contact angular spacing, connecting leads between each of said networks to a corresponding fixed contact, an ultra-high frequency oscillator circuit, and means to drive said rotary spark gap wheel in spaced relationship to said fixed contacts to connect by spark discharge each of said networks successively to impulse said oscillator circuit.

DAVID F. WINTER.
CARL A. CARLSON.

REFERENCES CITED

The following references are of record in the file of this patent:

UNITED STATES PATENTS

| Number | Name | Date |
|---|---|---|
| 2,415,116 | Stiefel | Feb. 4, 1947 |